(12) United States Patent  (10) Patent No.: US 6,347,578 B1
Yung  (45) Date of Patent: Feb. 19, 2002

(54) BREADMAKER WITH IMPROVED TEMPERATURE AND HUMIDITY CONTROL

(76) Inventor: Simon K. C. Yung, 6 Purves Road, Jardine's Lookout, Hong Kong (HK)

( * ) Notice: Subject to any disclaimer, the term of this patent is extended or adjusted under 35 U.S.C. 154(b) by 0 days.

(21) Appl. No.: 09/479,011

(22) Filed: Jan. 7, 2000

Related U.S. Application Data (62) Division of application No. 09/061,591, filed on Apr. 16, 1998, now Pat. No. 6,035,763.

(51) Int. Cl.$^7$ .................................................. A23L 1/18
(52) U.S. Cl. ........................... 99/468; 99/328; 99/329 R
(58) Field of Search ........................ 99/324, 525, 326, 99/328, 329 R, 329 P, 329 T, 348, 327, 468, 531; 426/549

(56) References Cited

U.S. PATENT DOCUMENTS 5,410,949 A * 5/1995 Yung ............................ 99/348
5,735,190 A * 4/1998 Sham ........................... 99/327

* cited by examiner

Primary Examiner—Curtis E. Sherrer
Assistant Examiner—Hao Mai
(74) Attorney, Agent, or Firm—Skjerven Morrill MacPherson LLP; Philip Yau (57) ABSTRACT

An improved breadmaker capable of maintaining the freshness of the bread baked for a period of time. A temperature sensor and a humidity level sensor located inside the baking chamber of the breadmaker monitor the ambient conditions inside the baking chamber. In response to these sensors, a surface heater and humidifier are employed to maintain a predetermined temperature and humidity level inside the baking chamber.

4 Claims, 7 Drawing Sheets

BREADMAKER WITH IMPROVED TEMPERATURE AND HUMIDITY CONTROL

This is a division of application Ser. No. 09/061,591, filed Apr. 16, 1998 now U.S. Pat. No. 6,035,763.

BACKGROUND OF THE INVENTION

This invention relates to an improved breadmaker and a bread making system capable of maintaining the freshness of the bread contained therein by monitoring and maintaining the ambient conditions such as temperature and humidity inside the baking chamber of the breadmaker.

Conventional breadmaker used at home generally has a baking chamber containing an electric heater at the bottom, a baking pan to be set inside the baking chamber for receiving ingredients therein, a stirrer for stirring and kneading the ingredients inside the baking pan and a stirring motor for rotating the stirrer in a specific manner.

In order to have a loaf of bread ready for morning consumption, the ingredients are usually prepared in advance and placed inside the baking pan overnight and subject to different steps of the breadmaking process such as stirring, kneading, leavening and baking. The entire breadmaking process usually takes several hours during the night to complete. After the breadmaking process is completed, the bread is usually left inside the baking chamber undisturbed until morning time. It may be several hours from the time the bread is ready to the time of consumption. During that time period, the bread will likely cool down. If the bread is reheated, it will harden due to the lost of moisture from evaporation, and thus affecting the taste and texture of the bread made.

For example, attempts have been made to reheat the bread in a microwave oven before consumption. However, this method is not preferred because of the extra step of removing the bread from the breadmaker and transferring it to a dish for microwave warming. In addition, even after reheating by microwave, the texture of the bread is still not satisfactory because the microwave warming process does not introduce any moisture back into the bread.

SUMMARY OF THE INVENTION

It is therefore an object of the present invention to provide an improved breadmaker generally of the type described above which, however, is capable of providing a controlled environment inside the baking chamber to keep the bread fresh for a period of time.

It is another object of the invention to provide an improved breadmaker capable of maintaining a desirable temperature, humidity, and aroma inside the baking chamber for a period of time.

It is still another object of the invention to provide an improved breadmaker capable of warming and maintaining the moisture inside the baking chamber to keep the bread contained herein warm and moist.

An improved breadmaker embodying the present invention, with which the above and other objects can be achieved, comprises a baking chamber having an electric heater at the bottom, a baking pan adapted to receive ingredients therein and be set inside the baking chamber, a stirrer for stirring and kneading the ingredients inside the baking pan and a stirring motor for rotating the stirrer in a specified manner.

The present invention also comprises ambient condition sensors for monitoring the ambient conditions inside the baking chamber. In the preferred embodiment, the ambient condition sensors comprises of a temperature sensor and a humidity sensor.

Furthermore, a humidifier and a surface heater are provided inside the baking chamber to provide sources of interior moisture and temperature. In addition, at least one vent hole is provided in the breadmaker to allow steam to escape from inside the baking chamber.

In a preferred embodiment, a controller is provided to control the humidifier and the surface heater in respond to the ambient condition sensors so that a controlled ambient environment can be maintained inside the baking chamber. The breadmaker according to the present invention is controlled by the controller to automatically carry out programmed sequence of operations used in different steps of the bread making process. The sequence of operations is stored in a storage in the controller, and can be either preprogrammed or manually inputted by the users. The preprogrammed or inputted parameters comprise: length of the keeping warm period after the baking is completed; temperature of the keeping warm period; time to wake up the breadmaker and to reheat the bread; inside humidity during the reheating period; temperature inside the baking chamber during the reheating period; and time to close off all the vent holes to prevent aroma and moisture from escaping from the baking chamber, etc.

Based on the programmed sequence of operations, the controller controls individual operation of the different components of the breadmaker (e.g. main heater, surface heater, humidifier, air circulating mechanism, vent holes and stirrer, etc) responding to the ambient condition sensors located inside the baking chamber. The controller determines the optimum combinations of the controlling parameters for the different components of the breadmaker during the kneading mode, baking mode, keeping warm mode, reheating mode and high heating mode, and thereby generates sets of control signals to control the various components of the breadmakers.

For example, during the kneading process, the controller first generates the appropriate control signals to control the electric heater and the stirrer motor to stir and knead the ingredients contained inside the baking chamber. Then, the controller generates control signals for suspending the operation of the stirrer motor to allow the ingredients to leaven.

In the baking mode, the controller turns on the electric heater to heat up the baking chamber for baking the dough contained therein. A controller with some of the above-mentioned features is disclosed in U.S. Pat. No. 5,704,277 issued to the same inventor of the present application, which is hereby incorporated by reference.

After the baking of the bread is completed, the present invention can keep the bread in preferably a warm temperature for later consumption (i.e. keeping warm mode). During the keeping warm mode, the controller turns on a surface heater along with a humidifier to maintain an predetermined warming temperature and humidity inside the baking chamber. After a predetermined period of time preprogrammed or entered by the user, the breadmaker will turn itself off automatically.

In the reheating mode, the breadmaker of the present invention can wake itself up at a selected time for reheating the bread. The breadmaker reheats the bread and reintroduces moisture back into the baking chamber so that the bread contained therein remains warm and moist.

In addition, in a preferred embodiment, the present invention provides a high heating mode. During the high heating mode, the main heater is turned on and the temperature inside the baking chamber is then raised to a sufficiently high temperature to drive off residual moisture and kill off any germs contained inside the baking chamber before the breadmaker is put away for storage.

Additional objects, features and advantages of various aspects of the present invention will become apparent from the following description of its preferred embodiments, which description should be taken in conjunction with the accompanying drawings.

DETAILED DESCRIPTION OF THE INVENTION

Figure 1:
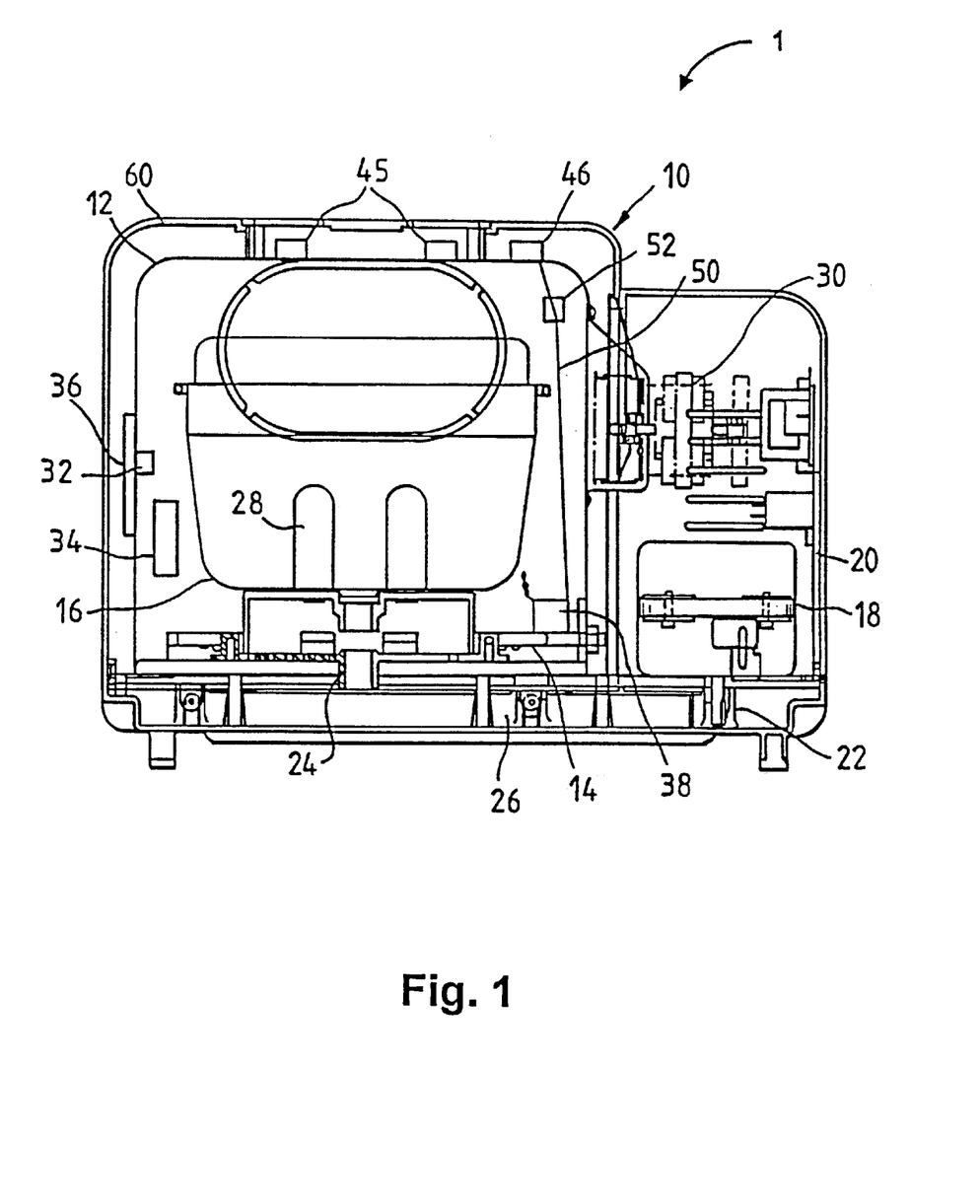
FIG. 1 is a schematic diagram of a breadmaker embodying the present invention.

FIG. 1 shows a breadmaker 1 embodying the present invention. The preferred breadmaker of the present invention comprises an outer housing 10, a baking chamber 12 having an electric heater 14 located near the bottom of the baking chamber 12, a baking pan 16 removably set inside the baking chamber 12 for receiving bread ingredients therein, a stirrer motor 18 located inside a motor chamber 20 adjacent to but removably separated by a chamber-separating wall from the baking chamber 12, and a baking chamber door 60 to allow ingredients to be introduced into the baking chamber 12.

The drive shaft 22 of the stirrer motor 18 is in motion-communicating relationship with a stirrer drive shaft 24 through a belt 26. In this way, by activating the stirrer motor 18 in a controlled manner, the stirrer blade 28 attached to the stirrer drive shaft 24 can be rotated in a specified manner such as alternatively in the clockwise and counter clockwise directions for stirring, kneading and mixing the contents of the baking pan 16.

In one preferred embodiment of the present invention, the baking pan 16 is combined with the baking chamber 12 so that the baking pan 16 is not detachable from the breadmaker 1 as shown in FIG. 1. In this preferred embodiment, the baking chamber 12 works as a baking pan for receiving the baking ingredients with the main heater 14 disposed inside the walls of the baking chamber 12 to prevent direct heating from the main heater 14 to the ingredients contained therein.

In yet another embodiment of the present invention, the main heater 14 is located in either the top portion or the side walls of the baking chamber 12. By placing the main heater 14 in the top portion or the side walls of the baking chamber 12, this preferred embodiment provides a more uniform heating to the ingredients contained inside the baking chamber 12.

The motor chamber 20 further contains therein a fan motor 30 adjacent to the baking chamber 12 and is separated from the baking pan 16 by a partition wall for circulating the air inside the baking chamber 12 for uniform heating inside the baking pan 16.

The breadmaker of the present invention further comprises one or more ambient condition sensors located inside the baking chamber 12 for detecting the interior ambient conditions such as the interior temperature and humidity inside the baking chamber 12. In the preferred embodiment, there are a temperature sensor 32 and a humidity level sensor 34.

The breadmaker of the present invention allows breads to be kept warm or, reheated when the breadmaker is in the keeping warm mode or the reheating mode respectively. A surface heater 36 and a humidifier 38 are provided to generate auxiliary heating and moisture for the baking chamber 12 during the keeping warm and reheating modes. The surface heater 36 and humidifier 38 operate in respond to the ambient conditions detected by the temperature sensor 32 and the humidity level sensor 34. The operations of the surface heater 36 and humidifier 38 are controlled by a controller 40 according to programmed sequences of operations stored inside the controller 40.

Figure 2:
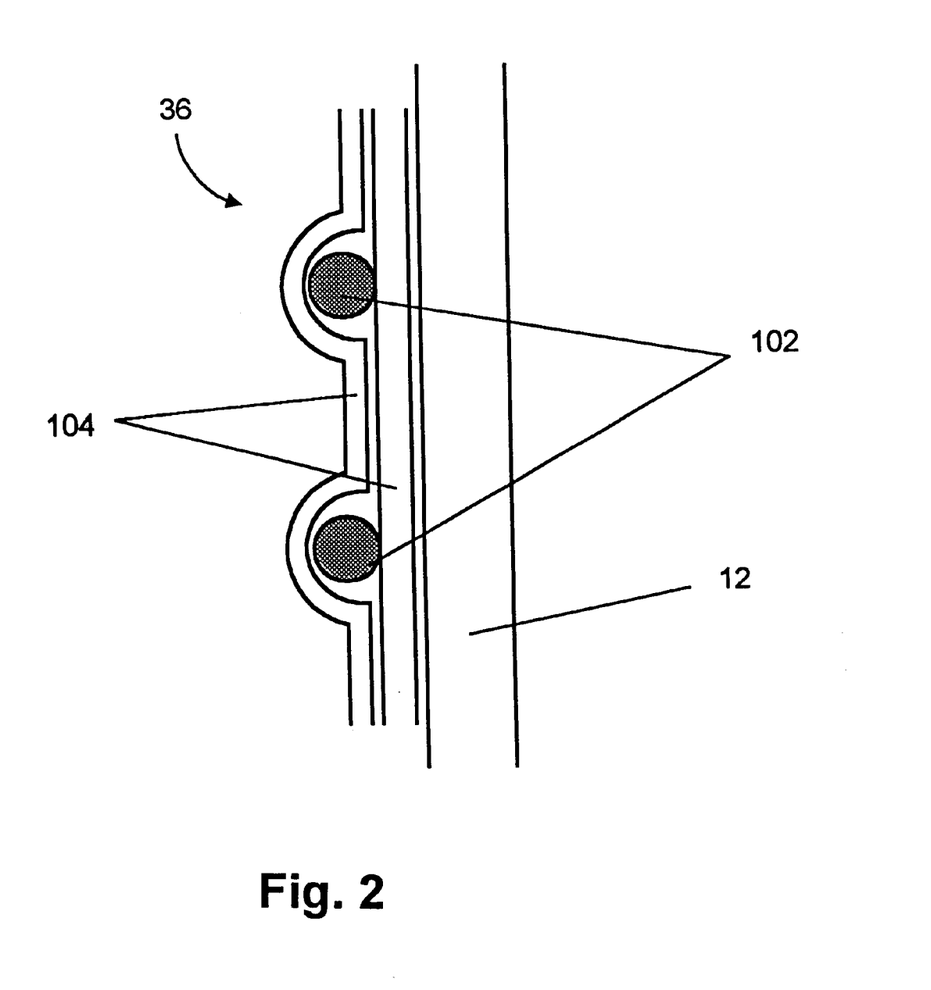
FIG. 2 is a schematic diagram of the construction of a surface heater.

FIG. 2 shows the detail of the surface heater 36 of a preferred embodiment of the present invention. The surface heater 36 comprises a plurality of heating elements 102 covered by aluminum papers 104 and attached to the outer surface of the baking chamber 12. It is preferably that the surface heater 36 covers substantially all the interior walls of the baking chamber 106. By wrapping the surface heater 36 substantially around the baking chamber 12, the temperature inside the baking chamber 12 can be evenly maintained.

Figure 3A:
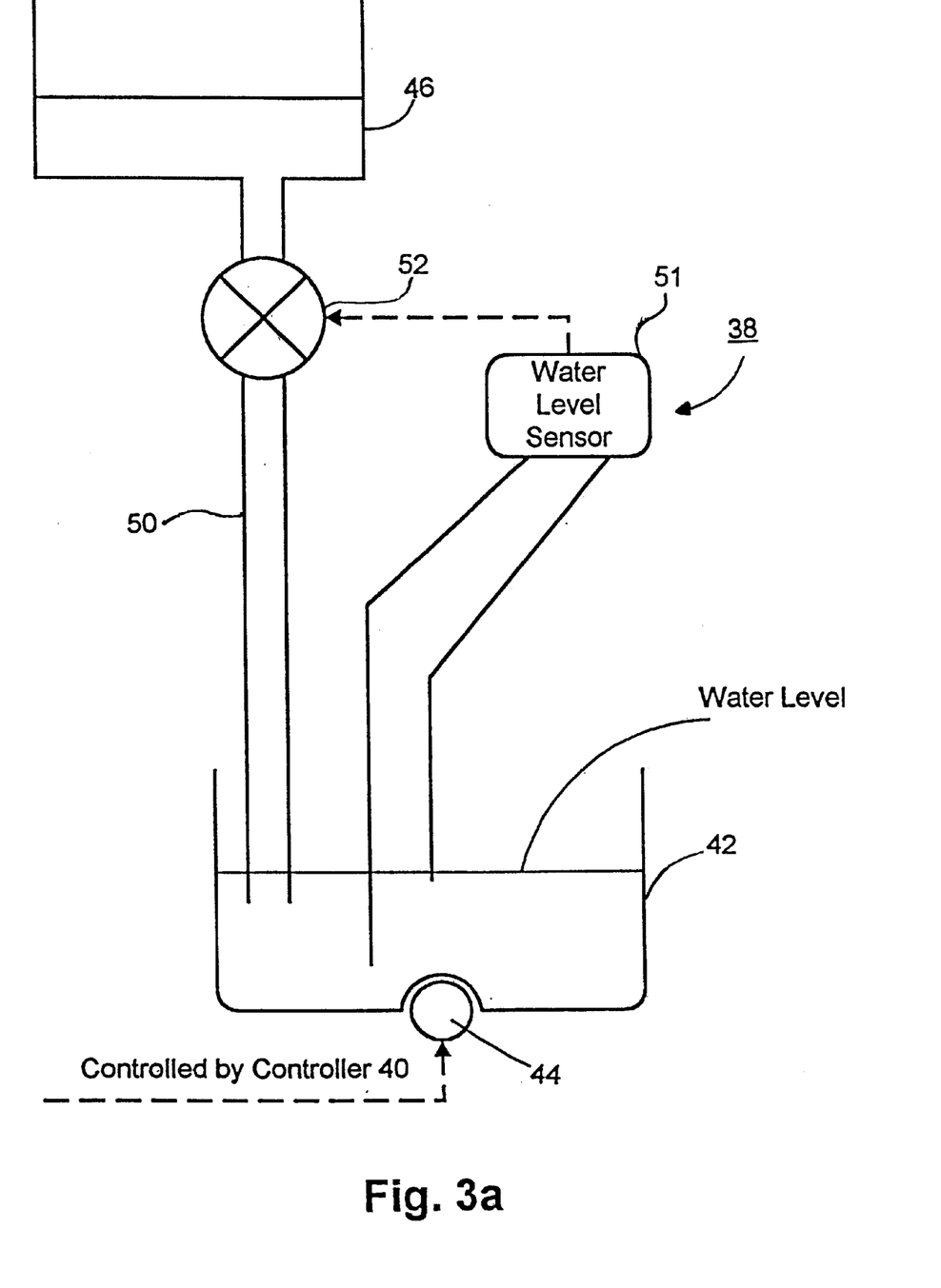
FIG. 3a is a humidifier having a water level sensor to maintain a predetermined water level inside a evaporator tank.
Figure 3B:
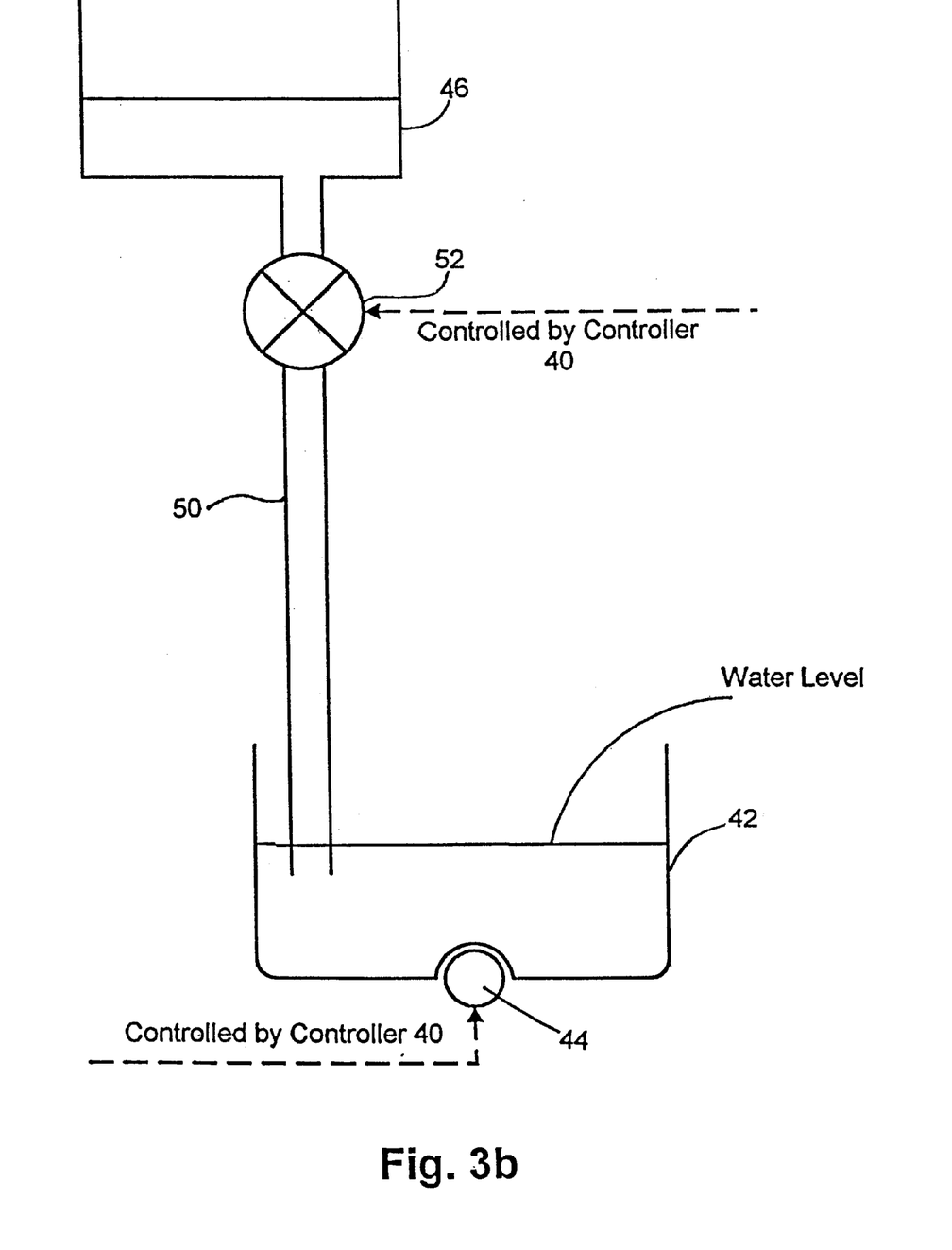
FIG. 3b is a humidifier having a water valve to allow water to flow into a evaporator tank when moisture is needed.
Figure 3C:
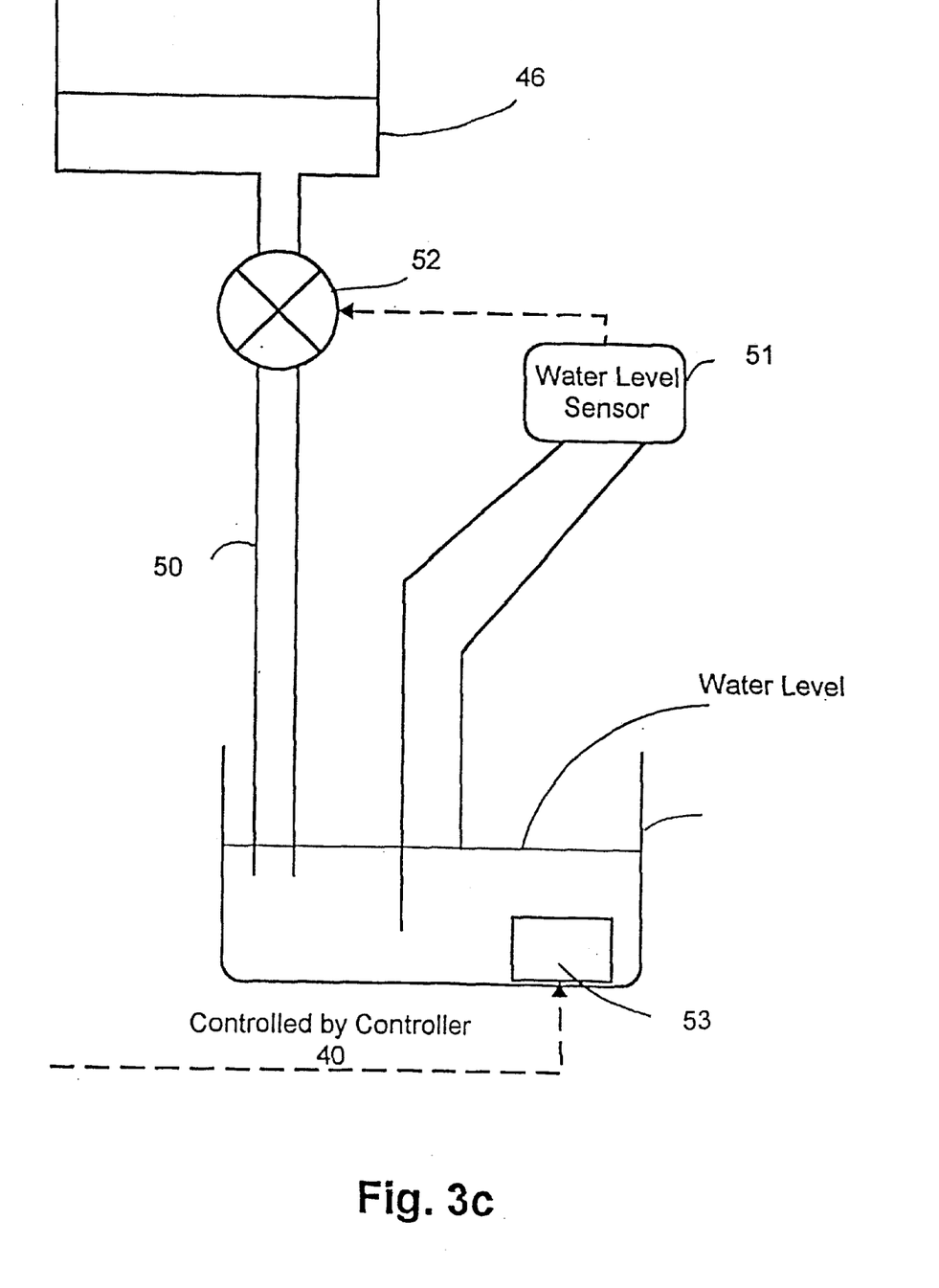
FIG. 3c is a humidifier having a transducer to heat the water contained in a evaporator tank.

FIG. 3a, 3b, and 3c show in more detail different embodiments of the humidifier 38. The humidifier 38 comprises an evaporator tank 42, an evaporator heater 44 for heating the evaporator tank 42 to generate water vapor inside the baking chamber 12, a water reservoir 46 for supply water to the evaporator tank 42, a water pipe 50 connecting the evaporator tank 42 to the water reservoir 46, and a water pipe valve 52 coupled to the water pipe 50 for controlling the amount of water flowing from the reservoir 46 to the evaporator tank 42. The evaporator heater 44 is controlled by the controller 40 according to the predetermined programmed sequences of operations. For example, when the humidity level inside the baking chamber 12 is sensed to be too low, the evaporator heater 44 will be activated to heat the water contained in the evaporator tank 42 for generating water vapor inside the baking chamber 12. On the other hand, if the controller determines that the humidity level inside the baking chamber 12 is sufficient, the evaporator heater 44 will be turned off to prevent further evaporating.

FIG. 3a shows one preferred embodiment of the present invention. In this embodiment, the water pipe valve 52 is controlled by a water level sensor 51. When the water level in the evaporator tank 42 is too high, the water level sensor 38 cuts off the water supply to the evaporator tank 42. On the other hand, if the water level is too low to provide sufficient water vapor, the water pipe valve 52 will be opened to allow water to flow into the heated evaporator tank 42 for producing more water vapor inside the baking chamber 12.

FIG. 3b shows another preferred embodiment of the present invention. The water pipe valve 52 is controlled by the controller 40. The water pipe valve 52 is normally off and is only switched on to allow water to flow into the evaporator tank 42 when the controller determines that the humidity level inside the baking chamber 12 is too low. Water vapor is produced once the water reaches the evaporator tank 42 heated by the evaporator heater 44. In this embodiment, the water level sensor 51 is not needed.

In order to simplify the overall design, in one embodiment of the present invention, the evaporator tank 42 can simply be heated by the main electric heater 14 instead of an evaporator heater. Therefore, a separate evaporator heater is not required because the electric heater 14 performs both the functions of normal bread baking and water vapor generating.

FIG. 3c shows yet another embodiment of the present invention, instead of using the main electric heater 14 or a separate evaporator heater, an electronic transducer such as an ultrasonic transducer 53 is placed in the evaporator tank 42 to generate water vapor for maintaining the appropriate humidity inside the baking chamber. Alternatively, the electronic transducer 53 may be used in place of the heating element 44 in the embodiment as shown in FIG. 3b.

In another preferred embodiment of the present invention, the breadmaker of the present invention is designed to perform as a steamer (e.g. for steaming Chinese style buns, and vegetables, etc.). In this preferred embodiment, the water reservoir 46 of the humidifier 38 is enlarged so that a large amount of water can be stored therein. By enlarging the water reservoir 46, a large volume of steam can be produced by the humidifier 38. Therefore, the humidifier 38 not only simply provides moisture into the breadmaker during different operating modes, the humidifier 38 can also perform as a steam generator for steaming the ingredients contained inside the breadmaker. In this steaming mode, the main electric heater 14 and the surface heater 36, for example, can be completely turned on so that the dough contained inside the breadmaker is steam cooked.

In another preferred embodiment of the present invention, the stirrer blade 28 is allowed to be detached from the stirrer drive shaft 24 and/or the baking chamber 12. Specifically, the stirrer blade 28 can be detached when the recipes do not call for any action from [the stirrer blade 28] it. For example, when only vegetables are steamed, the stirrer blade 28 is detached so that the entire baking chamber 12 can be filled with the vegetables.

The basic function of the controller 40 is for controlling the operations of various components of the breadmaker. The controller 40 provides control signals to the electric heater 14, stirrer motor 18, the motor fan 30, and also the air vent holes 42 (if the particular baking process requires such control). The detail operation of the controller 40 in controlling various components of the breadmaker is discussed in detail in U.S. Pat. No. 5,704,277 issued to the same inventor of the present application, and is hereby incorporated by reference. Another disclosure of a controller suitable for the present invention is given in U.S. Pat. No. 5,967,021 issued to the same inventor of the present application, and is also incorporated herein by reference.

In a preferred embodiment of the present invention, the controller 40 is designed to perform additional functions such as analyzing the interior temperature and humidity detected by the temperature sensor 32 and the humidity level sensor 34, and producing control signals according to the programmed sequences of operations to control different components inside the breadmakers in order to provide desired ambient conditions for warming and reheating the bread contained inside.

Figure 4A:
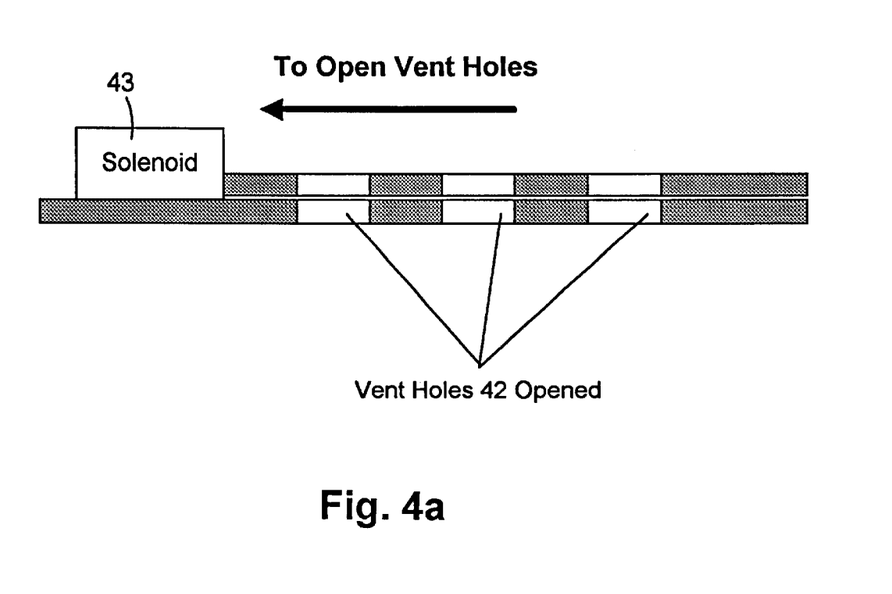
FIGS. 4a and 4b are schematic diagrams of the plurality of vent holes.
Figure 4B:
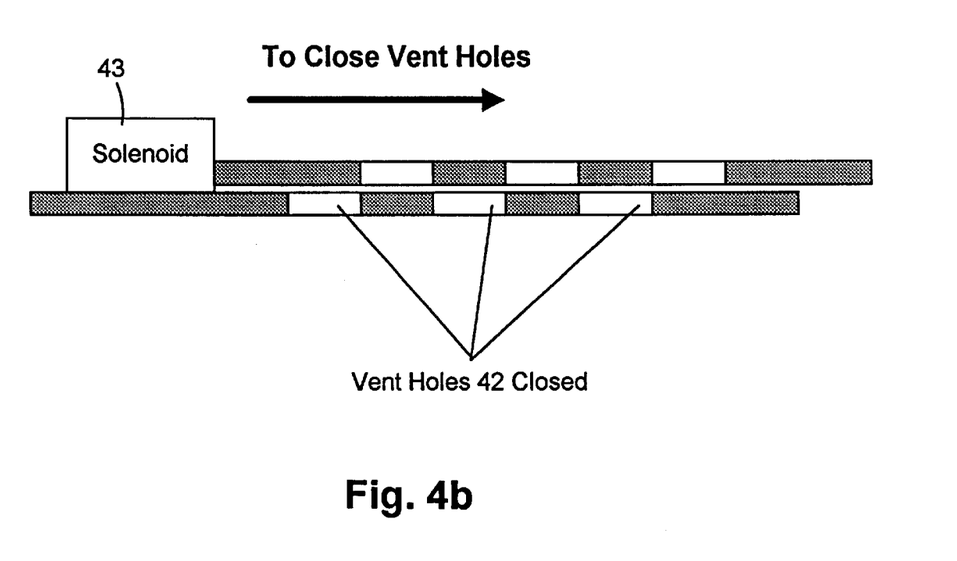

In one preferred embodiment of the present invention, a plurality of vent holes 42 are placed in the top wall of the breadmaker as shown in FIG. 1. In particular, the vent holes 42 can be opened or closed using a solenoid 43 as shown in FIGS. 4a and 4b. Depending on the bread recipe and/or the inside ambient conditions of the breadmaker, the vent holes 42 can be opened or closed by the controller 40. For example, during the baking process, the vent holes 42 can be opened by the controller 40 to let steam escape from the baking chamber 12. On the other hand, during some period in the baking process, the controller can close the vent holes 42 in order to retain moisture or aroma inside the breadmaker. Furthermore, the vent holes 42 can also be closed during the keeping warm mode to prevent lost of moisture from the bread.

Specifically, part of the novelty of this aspect of the invention is to allow the breadmaker to be programmed such that the vent holes 42 can be opened or closed during any period of time in any mode (e.g. kneading, baking, steaming, and keeping warm, etc.).

In yet another preferred embodiment of the present invention, a door seal is disposed between the baking chamber door 60 and the wall of the baking chamber 12 to prevent moisture from escaping from the baking chamber, particularly during the keeping warm stage. It should be noted that this door seal is preferably made of a plastic that is able to withstand multiple thermal cycles.

Figure 5:
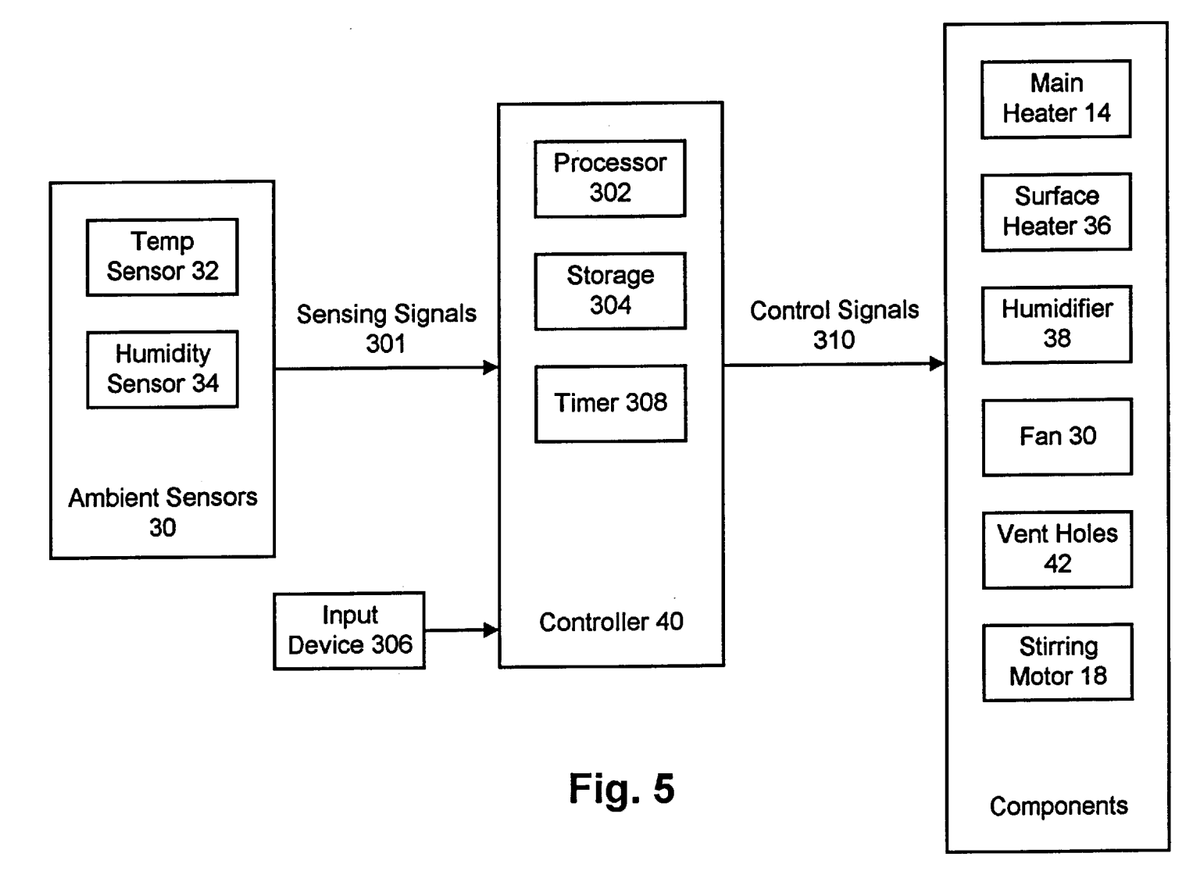
FIG. 5 is a block diagram of a control system used in the breadmaker, according to a preferred embodiment of the present invention.

FIG. 5 shows a block diagram of the controller of a preferred embodiment of the present invention. In the preferred embodiment, the ambient condition sensors 30 located inside the baking chamber 12 comprises a temperature sensor 32 and a humidity level sensor 34 for detecting the internal temperature and humidity inside the baking chamber 12. The sensing signals 301 generated from these sensors are then fed into the controller 40.

As shown in FIG. 5, the controller 40 comprises a processor 302, a storage 304 for storing sequences of operations for various components of the breadmaker, an inputting mechanism 306 for the user to input parameters for the baking, warming, and reheating processes, and a timer 308 for providing a clock for the controller 40.

Even though the basic operations of the controller 40 are disclosed in the U.S. Pat. No. 5,704,277, it is important to point out the additional functions performed by the controller 40 of the present invention.

In the preferred embodiment of the present invention, the controller 40 is responsive to the sensing signals 301 such as that of the interior temperature and humidity from the ambient condition sensors 302 and thereby processes the data according to the programmed sequences of operations stored in its storage 304. In the preferred embodiment, the ambient condition sensors 302 comprise a temperature sensor 32 and a humidity level sensor 34 disposed inside the baking chamber 12 for monitoring the interior temperature and humidity of the baking chamber 12. The controller 40 then generates sets of control signals 310 to control the various components of the breadmaker in respond to the internal temperature and humidity detected inside the baking chamber 12. By appropriate controlling of the operations of the humidifier 38 and the surface heater 36, desirable ambient conditions can be maintained inside the baking chamber 12 during the keeping warm and reheating modes of the breadmaker.

It should also be pointed out that the present invention allows the user to modify or enter parameters for different modes of the breadmaker. Instead of using the parameters preprogrammed by the breadmaker's manufacturer, the parameters can be modified by the user. This is accomplished by the inputting mechanism 306 and the parameters are stored in the storage 304 of the controller 40.

For example, the breadmaker can operate according to the preprogrammed parameters set by the manufacturer. Alternatively, the user can modify the parameters for only the keeping warm mode such as the length of the keeping warm period and the interior temperature for the keeping warm period, etc. Furthermore, the user can enter an entirely new recipe for a new kind of bread and set all the parameters as required by the recipe.

In another preferred embodiment of the present invention, the starting or finishing time for any baking cycle of the breadmaker 1 can be preprogrammed or programmed by the user. In other words, the user can prepare the ingredients in advance and program the breadmaker to start or finish any baking cycle at a preset time.

In the preferred embodiment of the present invention, the breadmaker can be programmed and operate in five different modes: (1) kneading mode; (2) baking/steaming mode; (3) keeping warm mode; (4) reheating mode; and (5) high heating mode.

During the kneading and baking/steaming modes, the present invention can be operated similarly to the breadmakers as discussed in U.S. Pat. No. 5,704,277 so that the humidifier 38 and the surface heater 36 are normally not used. However, under some circumstances if a recipe calls for the operations of the humidifier 38 and/or the surface heater 36, either one or both of the humidifier 38 and the surface heater 36 can be activated.

In the keeping warm mode, the breadmaker of the present invention maintains a predetermined ambient environment inside the baking chamber 12 as defined by the program and/or entered by the user. In this mode, the electric heater 14 is usually turned off. The less powerful surface heater 36 is turned on for warming the baking chamber 12 within a desirable temperature. In addition, the humidifier 38 supplies the water vapor needed for maintaining a desirable humidity level inside the baking chamber 12 in order to keep the moisture inside the bread. Further, in the keeping warm mode, the vent holes 42 are closed to prevent loss of moisture from the baking chamber 12.

The reheating mode is designed for reheating the bread after the bread has cooled down. For example, the bread can be reheated in the morning after staying inside the breadmaker overnight. In the reheating mode, the temperature inside the baking chamber 12 is closely monitored and controlled by the temperature sensor 32 and the surface heater 36. Furthermore, the humidity level inside the baking chamber 12 can be monitored and controlled by the humidity level sensor 34 and the humidifier 38 located inside the baking chamber 12.

In the preferred embodiment, during both the keeping warm and reheating modes, the electric heater and the stirrer motor 18 are usually turned off. The operation of the air circulating fan 30 is optional depending on the requirement of the recipe and the ambient conditions. For example, when more uniform ambient conditions are required inside the baking chamber 12, the air circulating fan 30 can be turned on by the controller 40.

Finally, in the high heating mode, the breadmaker's main electric heater 14 inside the baking chamber 40 is turned high in order to sterilize the baking chamber by killing off all the germs contained therein. Further, the high heat also eliminates the moisture contained inside the baking chamber to prevent mold forming.

It is an important feature of the present invention to have the humidity level sensor 34 and humidifier 38 located inside the baking chamber 12. The humidifier 38 is specifically designed to maintain the humidity level in the baking chamber 12 and keep the moisture inside the bread. Without such a feature, the bread will be dried by the surface heater 36 during the keeping warm and reheating modes.

It is to be understood that while the invention has been described above in conjunction with preferred specific embodiments, the description and examples are intended to illustrate and not limit the scope of the invention, which is defined by the scope of the appended claims.

What is claimed is:

1. A method of operating a breadmaker having a housing, a baking chamber formed inside said housing for baking ingredient, comprising:

providing a main heater for supplying heat to said baking chamber providing a surface heater between said housing and said baking chamber;

providing a humidity generator;

operating said breadmaker in a baking mode by activating said main heater for a predetermined period to bake the ingredient in the baking chamber; and operating said breadmaker in a keeping warm mode after said baking mode, said keeping warm mode further comprising:

sensing the temperature in said baking chamber sensing the humidity in said baking chamber; and activating said surface heater in response to said sensed temperature to maintain a controlled temperature; and activating said humidity generator and said exhaust fan in response to said sensed humidity to maintain a controlled humidity.

2. A method of operating a breadmaker as in claim 1, further comprising:

providing at least one opening from said baking chamber out of the housing; and closing said at least one opening during said keeping warm mode.

3. A method of operating a breadmaker having a housing, a baking chamber formed inside said housing for baking ingredient, comprising:

providing a main heater for supplying heat to said baking chamber providing a surface heater between said housing and said baking chamber;

providing a humidity generator;

operating said breadmaker in a baking mode by activating said main heater for a predetermined period to bake the ingredient in the baking chamber; and operating said breadmaker in a reheating mode at a predetermined time after said baking mode, said reheating mode further comprising:

sensing the temperature in said baking chamber sensing the humidity in said baking chamber; and activating said surface heater in response to said sensed temperature to maintain a controlled temperature; and activating said humidity generator in response to said sensed humidity to maintain a controlled humidity.

4. A method of operating a breadmaker as in claim 3, further comprising:

providing at least one opening from said baking chamber out of the housing; and closing said at least one opening during said reheating mode.

\* \* \* \* \*